(12) United States Patent
Lee

(10) Patent No.: US 8,503,865 B2
(45) Date of Patent: Aug. 6, 2013

(54) DISPLAY DEVICE AND METHOD FOR TIMER RECORDING A BROADCAST PROGRAM

(75) Inventor: Seung Yeol Lee, Gwangju-si (KR)

(73) Assignee: LG Electronics Inc., Seoul (KR)

( * ) Notice: Subject to any disclaimer, the term of this patent is extended or adjusted under 35 U.S.C. 154(b) by 1776 days.

(21) Appl. No.: 11/436,607

(22) Filed: May 19, 2006

(65) Prior Publication Data

US 2007/0019926 A1    Jan. 25, 2007

(30) Foreign Application Priority Data

May 20, 2005    (KR) .................. 10-2005-0042523

(51) Int. Cl.
*H04N 5/76* (2006.01)

(52) U.S. Cl.
USPC ........................................... 386/291

(58) Field of Classification Search
USPC .. 386/1, 46, 52, 83, 95, 124–126; 725/37–61, 725/105–134
See application file for complete search history.

(56) References Cited

U.S. PATENT DOCUMENTS

| | | | |
|---|---|---|---|
| 5,986,650 A * | 11/1999 | Ellis et al. ........................ | 725/40 |
| 6,408,435 B1 | 6/2002 | Sato | |
| 6,760,918 B2 * | 7/2004 | Rodriguez et al. ............ | 725/134 |
| 2002/0044764 A1 | 4/2002 | Akamatsu et al. | |
| 2003/0005453 A1 | 1/2003 | Rodriguez et al. | |
| 2004/0047601 A1 * | 3/2004 | Jeong .............................. | 386/95 |
| 2004/0187164 A1 * | 9/2004 | Kandasamy et al. ......... | 725/132 |
| 2005/0034154 A1 * | 2/2005 | Yeh et al. ........................ | 725/38 |
| 2009/0320073 A1 * | 12/2009 | Reisman ........................ | 725/51 |

FOREIGN PATENT DOCUMENTS

| | | |
|---|---|---|
| CN | 1179671 A | 4/1998 |
| CN | 1223512 | 7/1999 |
| EP | 1 320 256 A1 | 6/2003 |
| JP | 4-239888 A | 8/1992 |
| JP | 7-75030 A | 3/1995 |
| JP | 7-236096 A | 9/1995 |
| JP | 9-298775 A | 11/1997 |
| JP | 10-269652 A | 10/1998 |
| JP | 11-232727 A | 8/1999 |
| JP | 11-259926 A | 9/1999 |
| JP | 2000-268440 A | 9/2000 |
| JP | 2001-339696 A | 12/2001 |

* cited by examiner

*Primary Examiner* — Tat Chio

(74) *Attorney, Agent, or Firm* — Birch, Stewart, Kolasch & Birch, LLP

(57) ABSTRACT

A method of recording using a timer recording function in a display device is disclosed. More specifically, the display device receives an input data which is a user inputted instruction information for executing a timer recording function. Thereafter, the display device stores the instruction information which includes an instruction for a display recording device to begin and end recording a broadcast program of a certain designated channel at a specified time period in the future. Then, the device determines whether at least two display recording devices are connected to the display device and selects the display recording device for recording the broadcast program. Lastly, the display device transmits control data to the selected display recording device.

20 Claims, 10 Drawing Sheets

FIG. 1

| Time<br>Service | 9:00 AM | 10:00 AM | 11:00 AM · · · · |
|---|---|---|---|
| KBS1 TV<br>(CH 1) | Tom & Jerry<br>(Cartoon) | Good morning Korea-show | · · · · |
| KBS1 HDTV<br>(CH 2) | Morning News | Oprah-Talk show | · · · · |
| MBC TV<br>(CH 3) | · · · · | Rush Hour-Movie (PG-13) | · · · · |
| SBS TV<br>(CH 4) | L.A Lakers v. Sixers-Basketball | | PGA Tournament-Golf |
| · · · · | | | |

CONVENTIONAL ART

FIG. 2

| Service | Current Program | Next Program |
|---|---|---|
| KBS 1  TV | A⟶ Rush Hour | world cup special |
| KBS 1  HDTV | B⟶ PM 11:30 ~ AM 1:05 | AM 1:05 ~ AM 2:05 |
| KBS 2  TV | | |
| ~~MBC  TV~~ | In another action thriller starting jackie chan, a daughter of a chinese ambrssador in kidnapped in downtown los angeles, from hong kong, chow (jackie chan) is sent to LA | |
| SBS  TV | | |
| SBS  HDTV | | |
| 9/28,monday PM 7:47 | C | |

CONVENTIONAL ART

DISPLAY DEVICE AND METHOD FOR TIMER RECORDING A BROADCAST PROGRAM

This application claims the benefit of Korean Application No. P2005-42523, filed on May 20, 2005, which is hereby incorporated by reference.

BACKGROUND OF THE INVENTION

1. Field of the Invention

The present invention relates to a method of recording, and more particularly, to a method of timer recording a broadcast program.

2. Discussion of the Related Art

Since the introduction of color television, a digital technology, such as stereo sound, a remote control device, and closed captioning function, to name a few, has appeared as a part of the television system. Starting in the '90s, technology related to computers and network has been rapidly increasing and such a rapid improvement has fueled the public's interest for higher quality picture and multi-function television—hence, the introduction of digital television (DTV).

Broadcasting of digital data is advantageous since all elements or factors such as video, audio, and data is converted into digital data and compressed as done with computer data. Furthermore, if video and audio is digital signal processed, the data converted into digital data, which permits transmission of digital data with other data attached thereto.

Based on current technology, it is possible to transmit one high definition television program and three standard definition television program via a single channel. By broadcasting using digital signals, the quality of the picture improves significantly. Moreover, digital signal broadcasting self-resolves problems such as ghost phenomenon, which is caused by signals bouncing off obstacles, while providing quality and sound to home systems before enjoyed only in movie theaters.

A digital television, whose advantageous are described above, is comprised of an input device such as a remote control device, an audio and video (A/V) processor for decoding audio and video signals, a data processor for separating various channel information from service information, a database for storing the separated channel information, and a controller for controlling display of menu and an Electronic Program Guide (EPG).

The operation of the digital television is as follows. The digital television receives broadcast signals. Next, a demultiplexer demultiplexes the audio and video information and the service information from the received broadcast signals. The separated audio and video signals are processed to the A/V processor, and the service information is stored in the database. Here, the service information includes Program Association Table (PAT), Time Date Table (TDT)/Time Offset Table (TOT), and Event Information Table (EIT) to name a few. More specifically, the PAT includes information related to a plurality of programs, the TDT/TOT includes time information of each program, and the EIT includes information such as title, synopsis, program rating, and start/end time of the program.

The data processor extracts the EIT information from the stored service information, and then formats the extracted information using a specified format before storing the formatted information in the database. To describe the EPG, the following figures are used.

FIG. 1 is an example of a conventional EPG menu screen, and FIG. 2 illustrates the EPG menu screen of FIG. 1 when a specific channel is selected.

In FIG. 1, the EPG menu screen illustrates channels, order of programs, and time corresponding to the programs. In FIG. 2, a viewer selects a specific channel from the EPG of FIG. 1. If the viewer selects MBC TV, for example, the EPG provides a detailed information of the current program and the following program broadcasting on MBC.

As illustrated in FIGS. 1 and 2, the stored service information provided via the EPG menu screen, including the current program and the following program broadcasting on the selected channel, according to the viewer's selection. Furthermore, the EPG provides a list of plurality of channels, current time information, title of the program (A), time of broadcast (B), and a synopsis of the program (C).

After reviewing the provided information, the viewer can choose to record the current program or time record another program. If the program is selected to be time recorded, the controller records the time recorded program to a hard disk drive (HDD) provided internally at the scheduled time. However, if the television does not have an integrated HDD, the program can be recorded to an external device such as a video cassette recorder (VCR) or a digital video disk (DVD) recorder.

Although the conventional technology, as describe above, is functional, there are some problems that can be improved. First, the television does not have a time-record function. Second, even with the EPG, the display device cannot record if a memory device is not internally provided. Lastly, it is difficult for the viewer to time-record the VCR or the DVD recorder compared to programming the EPG of the display device to record a future program.

SUMMARY OF THE INVENTION

Accordingly, the present invention is directed to a display device and method for timer recording a broadcast program that substantially obviates one or more problems due to limitations and disadvantages of the related art.

An object of the present invention is to provide a method of recording using a timer recording function in a display device.

Another object of the present invention is to provide a display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording using a timer recording function in a display device is disclosed. More specifically, the display device receives an input data which is a user inputted instruction information for executing a timer recording function. Thereafter, the display device stores the instruction information which includes an instruction for a display recording device to begin and end recording a broadcast program of a certain designated channel at a specified time period in the future. Then, the device determines whether at least two display recording devices are connected to the display device and selects the display recording device for recording the broadcast program. Lastly, the display device transmits control data to the selected display recording device.

In another aspect of the present invention, a method of recording using a timer recording function in a display device includes displaying an Electronic Program Guide (EPG), selecting from the EPG a broadcast program for timer recording or for timer viewing, selecting a display recording device for recording the broadcast program if the timer recording is selected, organizing control data for providing operational instructions to the display recording device, storing information of the broadcast program and the control data, and transmitting in sequence the control data to the display recording device.

Yet, in another aspect of the invention, a method of recording using a timer recording function in a display device includes displaying an Electronic Program Guide (EPG), selecting from the EPG a broadcast program for timer recording or for timer viewing, storing information on timer viewing if timer viewing is selected, wherein the timer viewing information includes a specified time in the future to begin viewing the selected broadcast program on a certain designated channel, and returning to the EPG display after the timer viewing information is stored.

In further aspect of the invention, a display device comprises a wireless transceiver for receiving input data from an outside source and transmitting control data for controlling at least one display recording device, at least one memory for storing the input data and the control data, wherein the first memory stores the input data and the second memory stores the control data, and a control unit for acquiring the control data from the second memory and transmitting the control data to the display recording device via the wireless transceiver.

In another aspect of the invention, a display device comprises a wireless receiver for receiving input data from an outside source, a memory for storing the input data and the control data, a control unit for acquiring the control data from the memory, and a two-way communication cable connecting the display device and the display recording device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates an example of a conventional EPG menu screen;

FIG. 2 illustrates the EPG menu screen of FIG. 1 when a specific channel is selected;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 3:
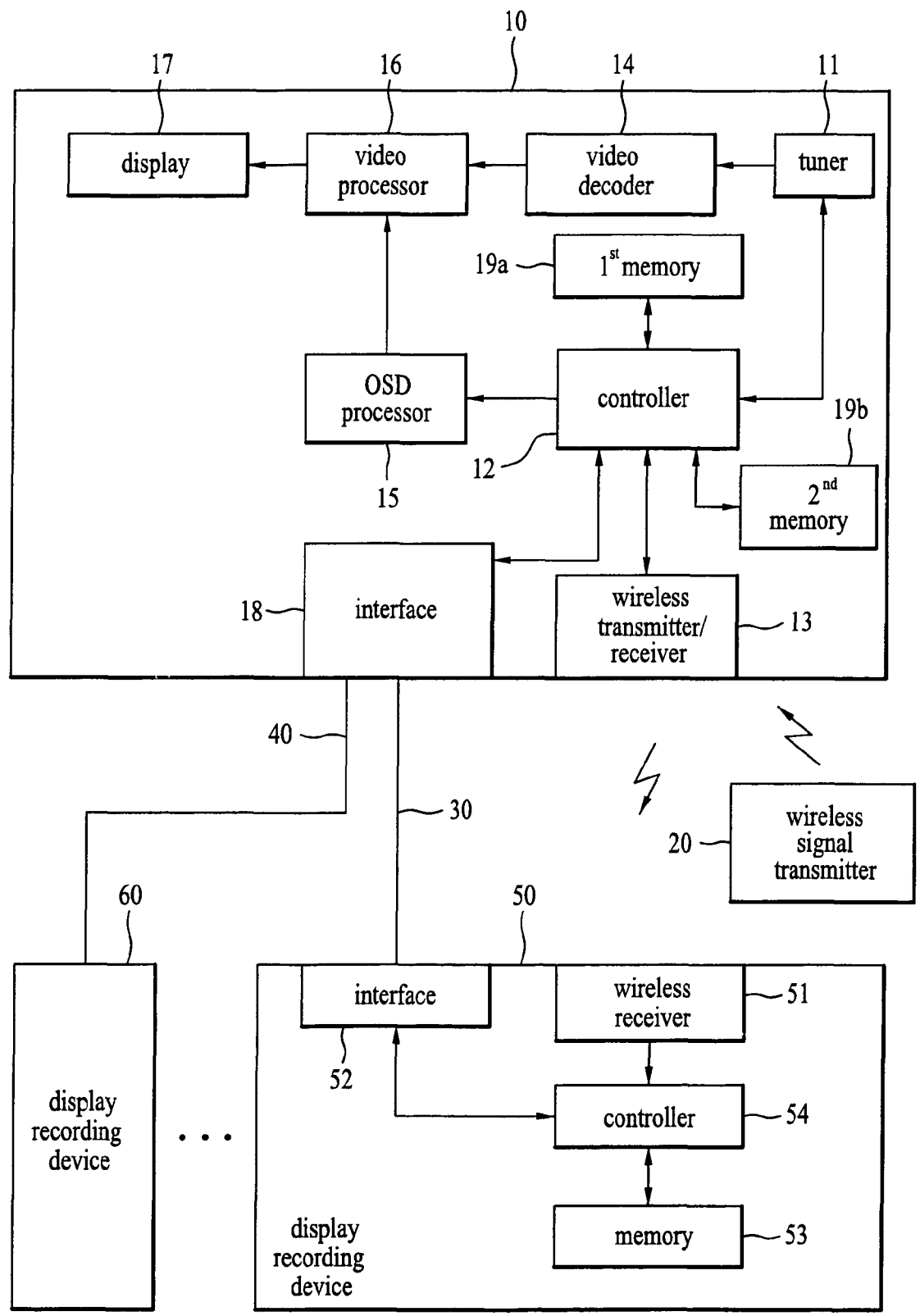
FIG. 3 illustrates a block diagram of a display device according to a first embodiment of the present invention.

FIG. 3 illustrates a block diagram of a display device according to a first embodiment of the present invention. In FIG. 3, a display device 10 is comprised of a tuner 11, a controller 12, a wireless transmitter/receiver 13, a video decoder 14, an On Screen Display (OSD) processor 15, a video processor 16, a display 17, an interface 18, and a memory 19 which further includes a first memory 19a and a second memory 19b.

In operation, a user selects a desired channel via the tuner 11. The wireless transmitter/receiver 13 receives control related wireless data from an outside source or transmits control codes related to wireless data to a device such as a display recording device. Here, the wireless communication can take place using an Infrared Data Association (IrDA) or Bluetooth, for example.

In addition, the video display 14 can decode the video information, transmitted from the transmission protocol (TP) via the selected channel, into red, green, and blue (RGB) signals. The OSD processor 15 processes the service information such as an Electronic Program Guide (EPG) information so that the EPG menu can be displayed on the display 17.

The video processor 16 processes the RGB signals and the EPG information so as to display the EPG menu on the display 17, which can display the RGB video signals and/or the EPG menu screen.

Furthermore, the interface 18 can be connected to at least one video display recorder, such as a first video display recording device 50 and a second video recording device 60. The interface 18 receives the received broadcast program or recorded program in the memory 53 via communication cables 30, 40 which connect to display recording device from the interface 18 of the display device 10. In this figure, a first cable 30 connects the first display recording 50 and a second cable 40 connects the second display recording device 60.

Figure 5:
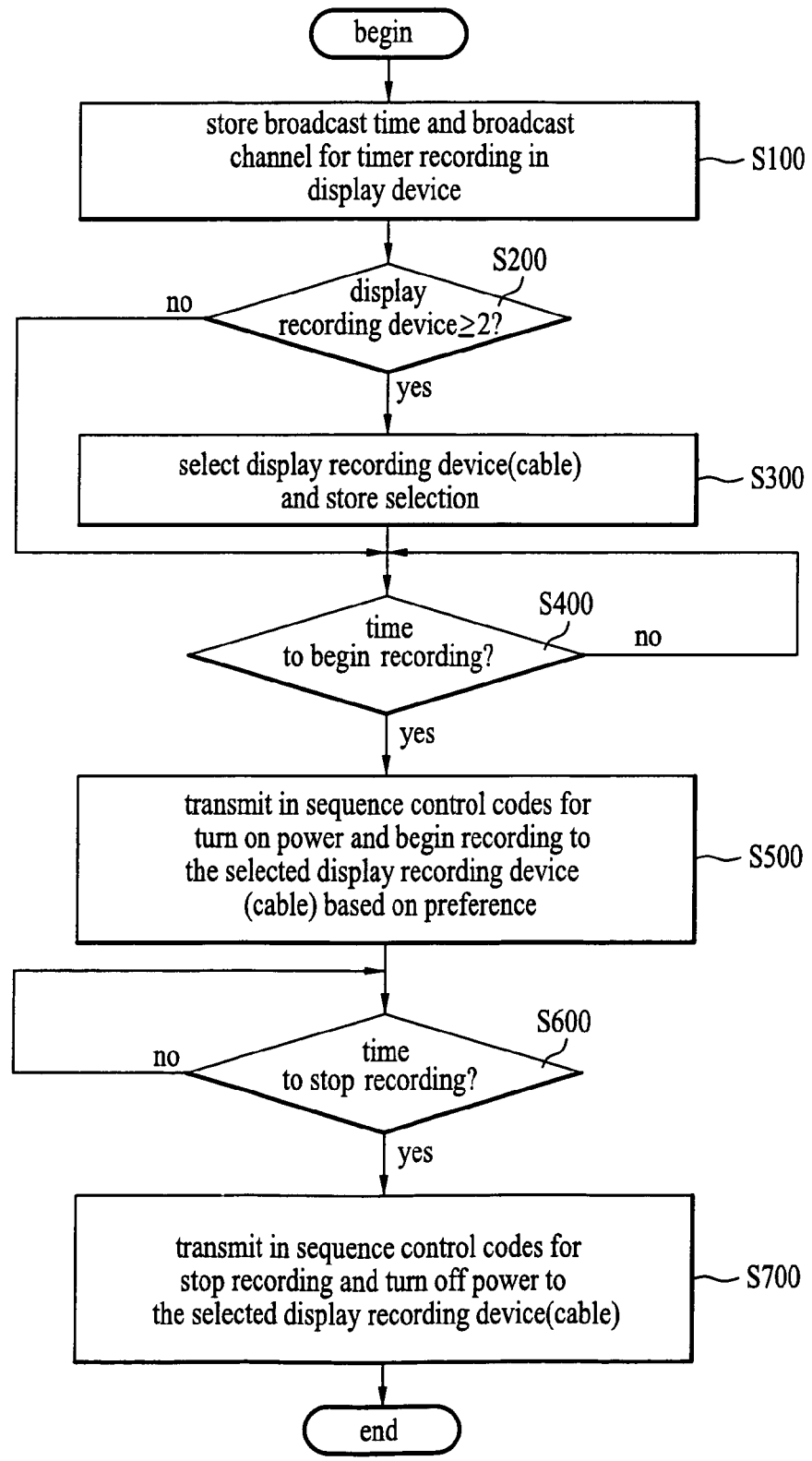
FIG. 5 is a flowchart illustrating a method of timer recording in a display device according to the present invention.
Figure 6:
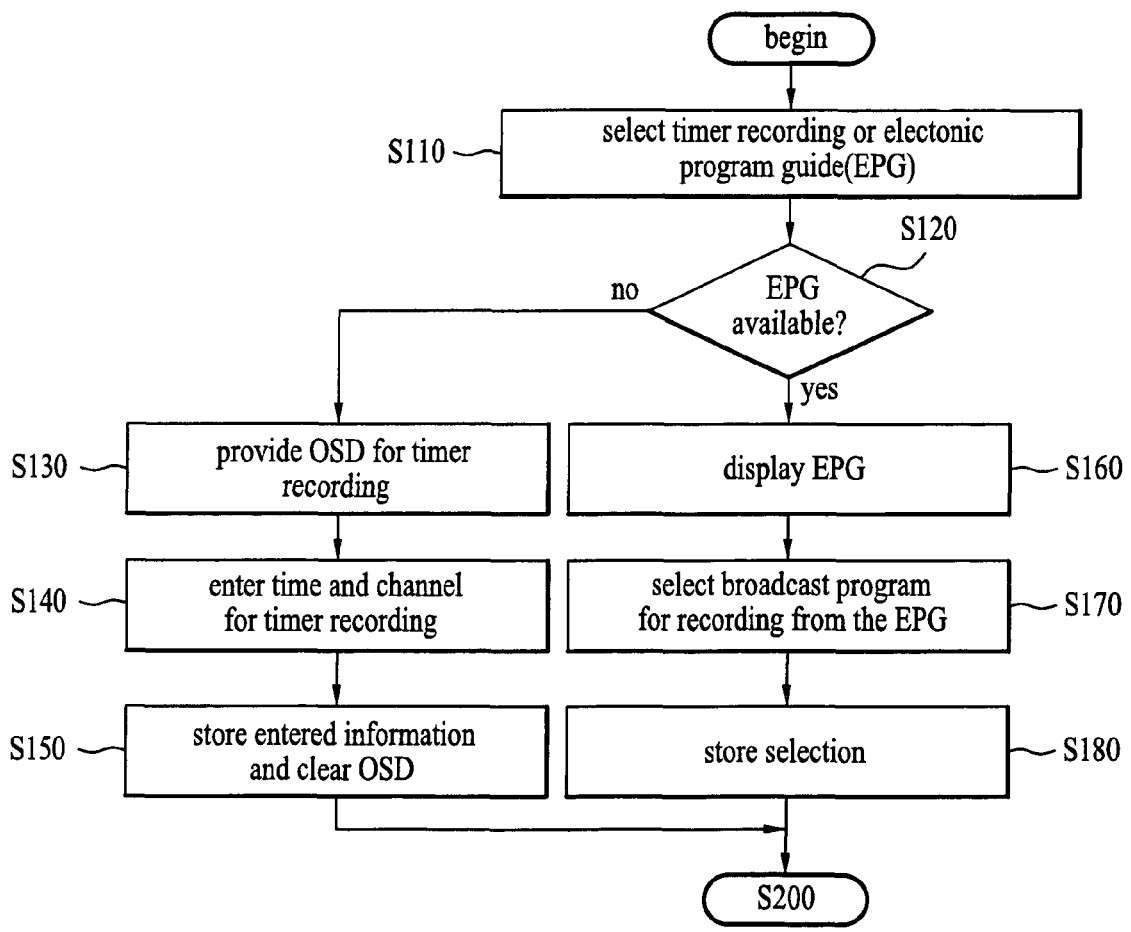
FIG. 6 is a flowchart illustrating a method of recording a broadcasting program from the timer recording method of FIG. 5.

The memory 19 further includes the first memory 19a and the second memory 19b. The first memory 19a can store codes related to power on/off, start recording, and end recording, for example, according to the names of the manufacturers of the display recording devices. In addition, the second memory 19b can store the timer programmed recording status (e.g., broadcast program time for programmed recording, programmed channel for programmed recording) of programs selected and a detailed programmed recording information of the display recording devices 50, 60. The timer recording or timer programmed recording is programming a recording device to begin and end recording a broadcast program (e.g., movie, news, sports) on a certain channel at some time in the future. The operation of timer recording is illustrated in FIGS. 5 and 6 using flowcharts.

In addition to controlling the display device 10, the control 12 transmits the time programmed recording status information stored in the second memory 19b and the control codes stored in the first memory 19a to the display recording devices 50, 60 via the wireless transmitter/receiver 13.

In the first embodiment of the present invention, the user enters data for timer recording (e.g., date and time for timer recording, channel to be recorded) using a wireless signal transmitter 20 (e.g., remote control device) to the wireless transmitter/receiver 13 while viewing the broadcast program on the display 17 or by using the EPG menu screen. In timer recording, the user can also select the display recording device 50, 60. When the display recording device is selected for timer recording, the control 12 stores information on the data for timer recording and the selected display recording device 50, 60 to the second memory 19a. In this embodiment, a method of inputting command for timer recording is not limited to using the wireless signal transmitter, but can also be inputted directly using local keys (not illustrated) provided on the display device 10.

When it is time to start recording according to the selected timer recording, the control 12 transmits in sequence the control codes (e.g., code for turning on power to the display recording device, code for starting recording), based on the manufacturer type, from the first memory 19a to the wireless receiver 51 of the display recording devices 50, 60 via the wireless transmitter/receiver 13. Moreover, when it is time to terminate the recording according to the selected timer recording, the control 12 transmits in sequence the control codes (e.g., code for stop recording, code for turning off power to the display recording device), based on the manufacturer type, from the second memory 19b to the wireless receiver 51 of the display recording devices 50, 60 via the wireless transmitter/receiver 13. Here, the control 12 reads and acquires the control codes per manufacturer before sequentially transmitting to the display recording devices 50, 60. Therefore, preferably, the transmission should be made based on the order of preference (e.g., number of sales per country).

Furthermore, the transmission cables 30, 40 connecting the display device 10 and the display recording devices 50, 60 can be a non-digital cable or a digital cable, such as IEEE1394 cable or high definition multimedia interface (HDMI) cable, depending on the selected display recording device. To put differently, where one of the display recording devices 50, 60 is a VCR while the other is a DVD recorder, and if the VCR is selected, the VCR is connected to the display device with the non-digital cable. However, if the DVD recorder is selected, the DVD recorder can connect to the display device with the non-digital cable or the digital cable (e.g., IEEE1394 cable or HDMI cable). Here, the IEEE1394 cable and the HDMI cable are two-way communication cables whereas the non-digital cables are one-way communication cable. As such, if the connection is made with the digital cable, the display device can acquire the company code of the display recording device via the two-way communication line. Therefore, when the display device transmits the control code to the display recording device, the control code corresponds to the manufacturer of the display recording device. Furthermore, if more than one display recording device is selected for timer recording, any combination of a VCR, a DVD recorder, a DVD recorder with HDD, a digital video home system (DVHS), can be used, for example.

It is through the communication cables 30, 40 the recorded program(s) is transmitted to the display device 10 and in turn, the user can view the recorded program through the display 17 of the display device 10.

The display recording device 50 is comprised of a wireless receiver 51, an interface 52, a memory 53, and a control 54. The operation of the display recording device can be as follows. The wireless receiver 51 receives in sequence control codes (e.g., power on code, start recording code, end recording code, and power off code) from the wireless transmitter/receiver 13 of the display device 10. Thereafter, the wireless receiver 51 transmits the received control codes to the control 54. According to the action commands of the control codes, the control 54 turns on the display recording device 50, records the broadcasting program to the memory 53 (e.g., video cassette, DVD, HDD), and then terminates recording and turns power off.

Second Embodiment

Figure 4:
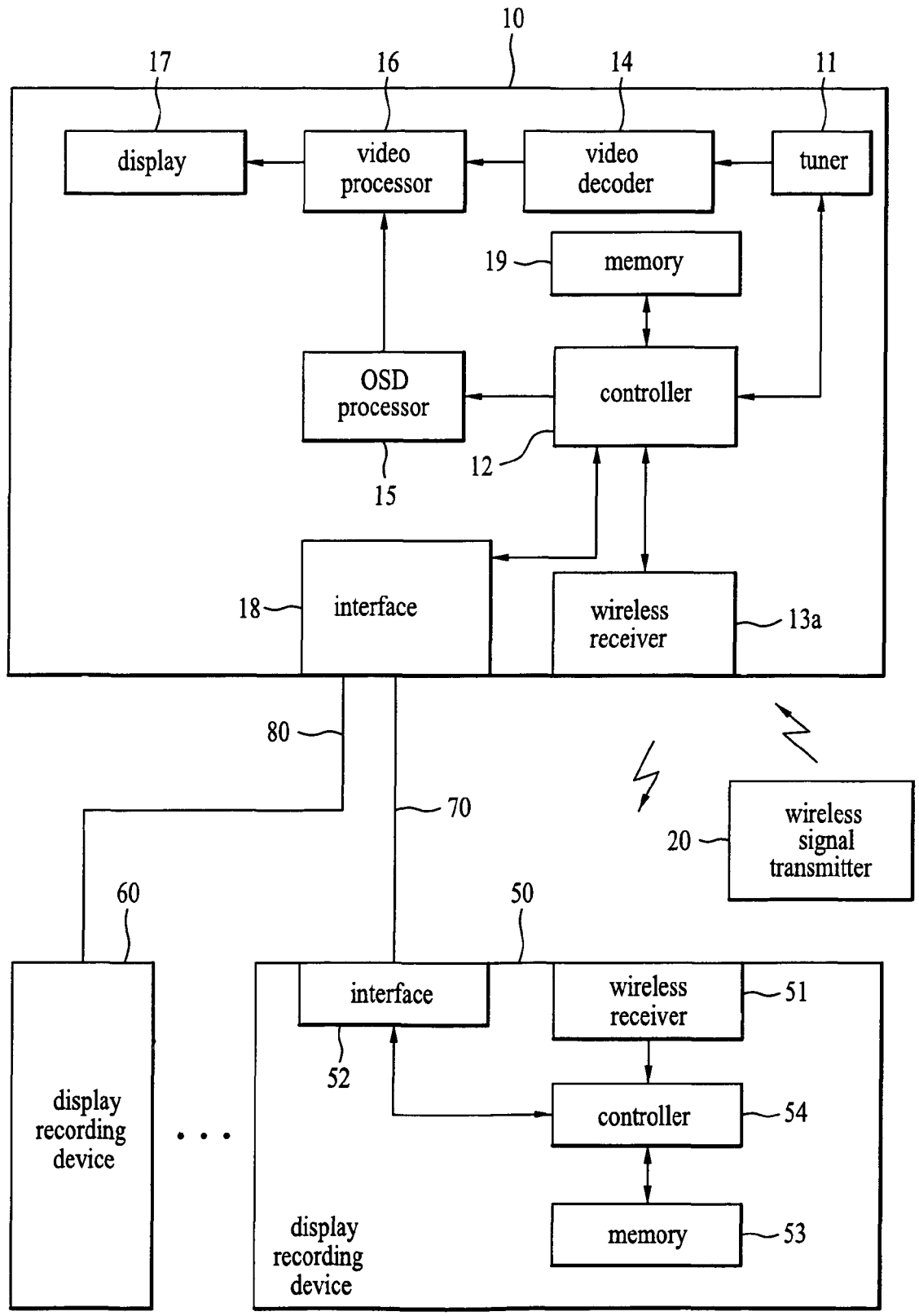
FIG. 4 is another block diagram of display device illustrating a second embodiment of the present invention.

FIG. 4 is another block diagram of display device illustrating a second embodiment of the present invention. The composition of the display device according to the second embodiment of the present invention is similar to the display device 10 of the first embodiment. In detail, the display device 10 of the second embodiment comprises a tuner 11, a control 12, a wireless receiver 13a, a video decoder 14, an OSD processor 15, a video processor 16, a display 17, an interface 18, and a memory 19.

Different from the first embodiment, the cables 70, 80 of the second embodiment are two-way communication cables or digital interface cables (e.g., IEEE 1394 cable, HDMI cable). Here, the cable 70 connects the interface 18 of the display device 10 with the interface 52 of the display recording device 50. In addition, the wireless transmitter/receiver 13 of the first embodiment is replaced with the wireless receiver 13a in the second embodiment. Furthermore, where the first embodiment included a first memory 19a and a second memory 19b, the second embodiment includes only one memory, namely, a memory 19. As such, the control codes (e.g., power on/off, start/end recording) and timer recording status information (e.g., program record start/end times, program record channel), formerly stored in two memories are stored in the memory 19.

To put differently, because the two-way communication cables 70, 80 permits transmitting and receiving of data/information between the display device 10 and the display recording devices 70, 80, the display does not have to transmit control codes wirelessly, and since the display device 10 already has company code information of the display recording devices via the two-way communication cables, unnecessary transmissions of control signals according to preference can be reduced or eliminated.

The second embodiment is operative if all the communication cables are two-way cables or digital interface cables. If, however, one of the cables is a one-way cable, such as the VCR cable or DVD cable, having a wireless transmitter/receiver 13 of the first embodiment would be more effective and efficient than the wireless receiver 13a of the second embodiment.

FIG. 5 is a flowchart illustrating a method of timer recording in a display device according to the present invention. In FIG. 5, the user enters the broadcast time and broadcast channel for timer recording to the display device, and the user inputted information is stored in the display device (S100). Next, the display device determines whether more than two display recording devices are connected to the display device (S200). If it is determined that there are more than two display recording devices connected to the display device, the user can choose a first display recording device for timer recording a broadcast program and choose a second display recording device for timer recording another broadcast program (S300). As examples of display recording devices, a VCR, a DVD recorder, a DVD recorder with HDD, and DVHS, to name a few, can be used.

After the user selects the display recording device and the selection is stored in the display device, the control of the display device determines whether the current time matches the timer recording time (S400). If the program time and current time match, the control of the display device transmits the power on code and start recording code in sequence to the display recording devices (S500). Here, the transmission of control codes can be made to the display recording devices based on preference (e.g., number of display recording devices sold per country). For example, assume that a first display recording device is manufactured by company A and a second display recording device is manufactured by company B. If the first display recording device has a higher sales volume than the second display recording device, the control codes are first transmitted to the first display recording device of company A, and thereafter transmitted to the second display recording device of company B.

Based on the transmitted control codes, the selected display recording device turns on the power and records the broadcast program. After that, the control signal of the display device determines whether it is time to end recording of the broadcasting program (S600). If the control of the display device determines that is time to end recording, the control transmits the end recording code and the power off code in sequence to the display recording devices based on the preference (S700).

FIG. 6 is a flowchart illustrating a method of recording a broadcasting program from the timer recording method of FIG. 5. In FIG. 6, a user selects a timer recording function or a program guide menu (or key) using a wireless signal transmitter 20 (S110). The display device then determines whether an electronic program guide (EPG) is available (S120). If the EPG is not available, an OSD is provided for timer recording (S130). Thereafter, the user can enter timer recording information and the channel to be recorded (S140). Upon completion of command input, the entered information is stored and the OSD is cleared from the screen (S150).

If, however, the EPG is available, the EPG menu is displayed (S160). From the EPG menu, the user can select timer recording (S170), and the selected information is then stored (S180).

Figure 7:
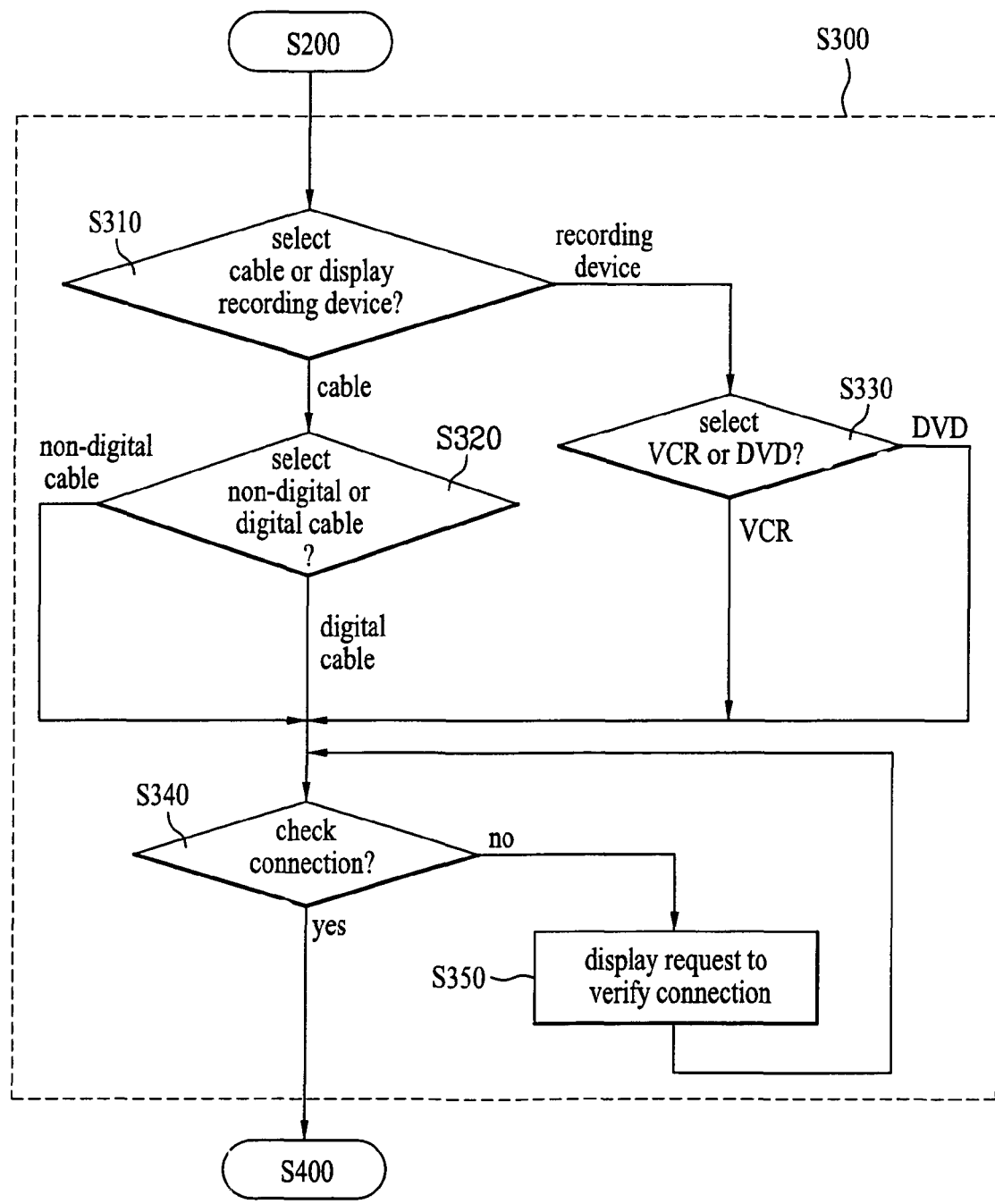
FIG. 7 is a flowchart illustrating a method of selecting a display recording device for the timer recording method of FIG. 5.

FIG. 7 is a flowchart illustrating a method of selecting a display recording device for the timer recording method in connection with FIG. 5. In FIG. 7, at least two display recording devices are connected to the display device. The user can select from the OSD a timer recording option based on the type of connection cable or the display recording device (S310).

If the user selects to record using a timer recording function based on the connection cable type, the user can choose between a non-digital cable or a digital interface cable (S320). The non-digital cable enables one-way communication between the display device and the display recording device. The digital cable enables two-way communication between the display device and the display recording device. For example, if the user selects the choose a recording medium based on the connection cable, one display recording device can be a VCR connected with a non-digital cable, while the other display recording device can be a DVD recorder connected with a digital interface cable (e.g., IEEE1394 cable or HDMI cable). However, if the connection cables for the VCR and the DVD recorder are both non-digital cables, a message on the OSD would appear to ask the user to select a connection cable connected to either the display device or the display recording device from the two non-digital cables.

If, on the other hand, the user selects to record using a timer recording function based on the recording device type, the user can choose any one of the connected display recording devices (e.g., VCR or DVD recorder) from the menu on the OSD (S330).

After the user makes a selection between the connection cable-based recording or the display recording device-based recording, the display device determines the status of the connection between the display device and the user selected display recording device (S340). If it is determined that the cable is not connected or improperly connected, a message is provided asking the user to check the connection and to establish proper connection (S350). If, however, it is determined that the connection of the cable is properly established, the display device then checks if it is time to begin recording the user-selected broadcast program (S400).

Figure 8:
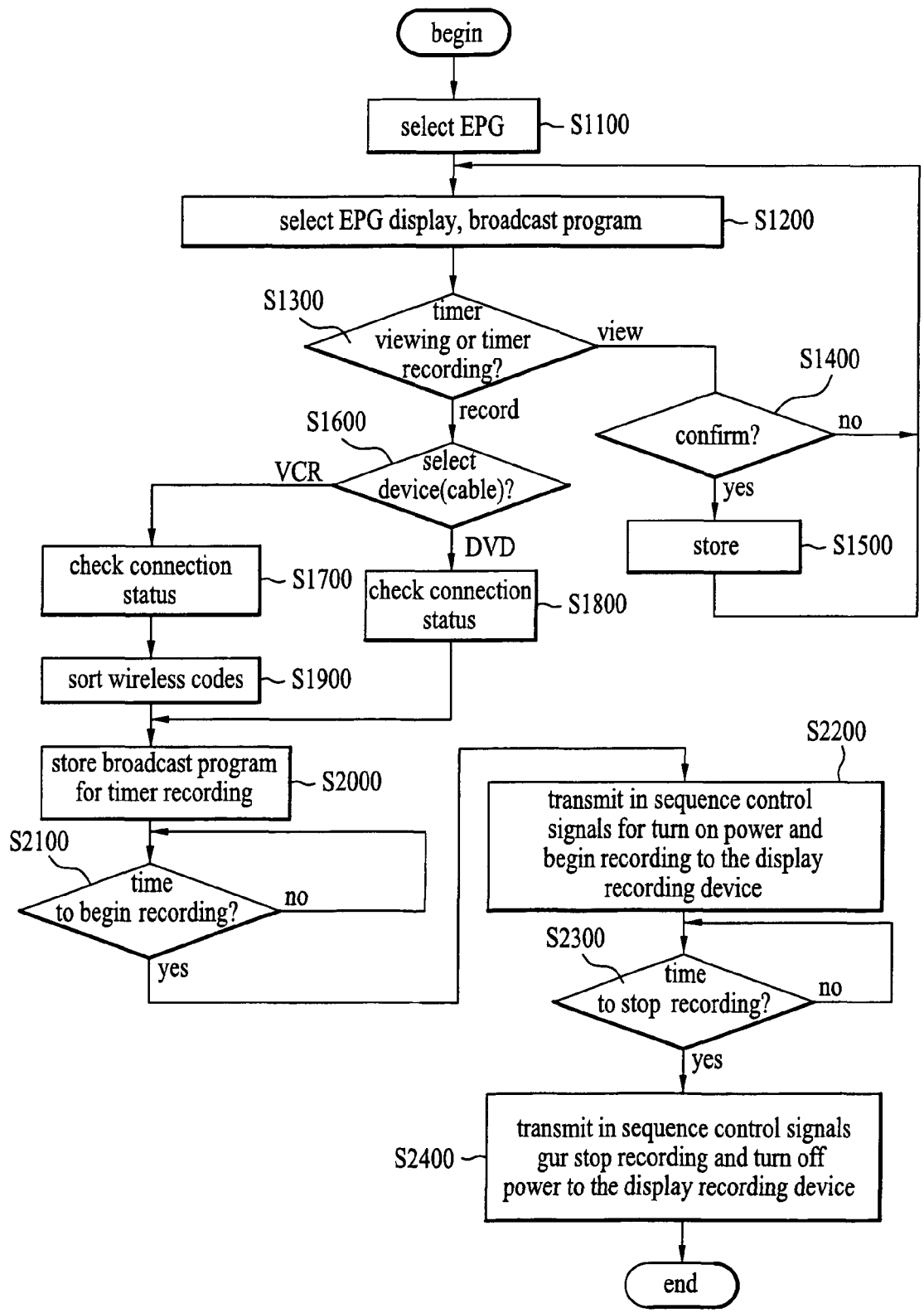
FIG. 8 is a flowchart illustrating a method of recording using a timer recording function according to the second embodiment of the present invention.

FIG. 8 is a flowchart illustrating a method of recording using a timer recording function according to the second embodiment of the present invention. In FIG. 8, the EPG can be selected by the user by pressing the EPG selection button (or key) or the EPG from the menu (S1100). When selected, the EPG screen is display on the screen from which the user can select timer recording function, including the channel to be recorded, or the user can choose to view a certain broadcast program at a specified future time (S1200). Thereafter, the display device determines which selection (i.e., timer recording or timer viewing) was made by the user (S1300).

If it is determined that the user has selected to view a certain broadcast program at a specified future time, a timer viewing confirmation inquiry (i.e., yes or no) is displayed on the screen (S1400). In response, if the user selects 'yes,' the display device stores the timer viewing information (e.g., time and channel) (S1500). In operation of timer viewing, the certain broadcast program is displayed over the currently viewing broadcast program at the time of the programmed time. For example, if the viewer was viewing a broadcast program on Channel 7 and the timer viewing programmed broadcast program is on Channel 10, when it is time to view according to the programmed timer viewing feature, the channel switches from Channel 7 to Channel 10. Moreover, a message indicating impending channel change can be displayed at specified time prior to switching the channel. For example, the message indicating change of channel from Channel 7 to Channel 10 can be displayed two minutes before the switch. Also, the message display can be in various forms, such as a picture-in-picture, a picture-on-picture, a ticker, etc. In addition, if the display device is turned off, and it is time programmed in the timer viewing feature, the display device can be automatically turned on.

However, if it is determined that the user has selected to record a broadcast program, the user is asked to select a display recording device (e.g., VCR or DVD recorder) from the OSD menu (S1600).

Here, if the VCR is selected as a medium to perform timer recording, the connection status between the display device and the VCR is confirmed (S1700), and the control codes for the VCR based on manufacturer preference can be sorted (S1900). However, if the DVD recorder is selected to perform timer recording, the connection status between the display device and the DVD recorder is checked (S1800).

After the connection status is determined, the display device stores the timer recording information of the selected broadcasting program (e.g., display recording device, channel to be recorded, and detailed information including time) (S2000). Next, the control of the display device determines whether it is time to begin recording (S2100). If it is time to begin recording, the display device transmits in sequence the control code for turning on power of the display recording device and the control code for begin recording according to the preference of the display recording device manufacturer (S2200). Thereafter, the control of the display device determines if it is time to stop recording (S2300). If it is time to stop recording, the display device transmits in sequence the control code for end recording and the control code for turning off power of the display recording device according to the preference of the display recording device manufacturer (S2400).

Figure 9:
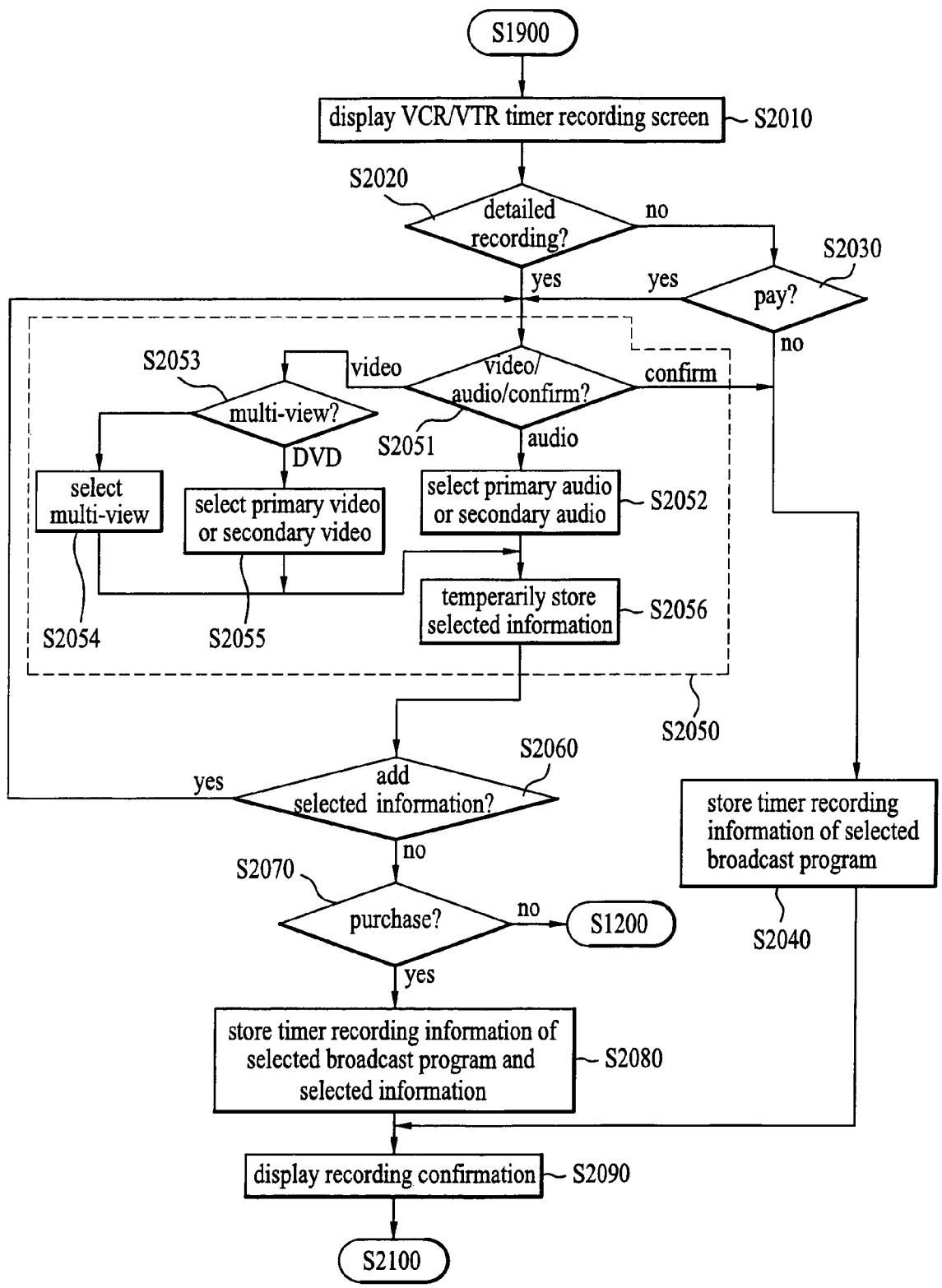
FIG. 9 is a flowchart illustrating a method of recording using a timer recording function in a VCR in connection with the method of FIG. 8.

FIG. 9 is a flowchart illustrating a method of recording using a timer recording function in a VCR in connection with the method of FIG. 8. In FIG. 9, after the connection is firmly established between the display device and the VCR (or a video tape recorder), the control codes are sorted and the VCR recording screen is displayed as OSD (S2010). Next, the display device asks via the OSD whether the user wishes to select additional recording features (S2020).

If the user does not decide to perform a detailed recording, the display device determines whether the broadcast program is a paid program (S2030). If it is determined that the broadcast program is not a paid program, the timer recording information of the selected broadcast program is stored in the display device (S2040), and as message notifying that the timer recording has been programmed is displayed (S2090).

However, if it is determined that the user has decided to perform a detailed recording, or the broadcast program is a paid program, a message is displayed asking if the user wants to add an item (S2050). Adding an item includes a display on screen asking the user to select any one of the choices (S2051). The choices are video, audio, or confirm.

If the user selects 'confirm,' it means that a paid program has been purchased, or the user no longer desires to continue with the detailed recording. Therefore, the confirmation of end detailed recording is displayed (S2090).

Alternatively, if it is determined that the user has selected 'audio,' the user is further asked to select primary audio, secondary audio, or primary/secondary audio (S2052). Thereafter, the selection is stored (S2056). Here, the secondary audio can include a plurality of languages, such as English, Chinese, Japanese, and French.

Alternatively, if it is determined that the user has selected 'video,' the user is asked is select a multi-view function (S2053). Here, multi-view refers to a plurality of camera angles from which the video was shot (e.g., video shot from camera 1, camera 2, or camera 3). If the user selects the multi-view function, the user can then select the camera angle (or which camera) to view the video (S2054), and this selection information is temporarily stored (S2056).

However, if the user did not select the multi-view function, the user then selects a primary video or secondary video to view the video (S2055), and this selection is stored (S2056). Here, if a digital broadcasting (standard definition quality) is used in the secondary video which means three to four broadcast programs transmitted simultaneously, the user would have to choose from one broadcast program from the transmission.

Next, the user is asked if the user desires to add another item (S2060). If the user selects to add another item, the user can then add a new item such as a multi-view function, primary audio or video, or secondary audio or video (refer to S2050 for detail). However, if the user chooses not to add another item, the user is asked to pay for the paid program (e.g., pay-per-view) (S2070).

If the user pays for the paid program, the recording information temporarily stored is stored in the display device (S2080). Here, the temporality stored recording information would be timer recording information and the channel to be recorded information. However, if the user decides not to pay for paid program, the EPG screen is presented to the user for making other selections (S1200).

Figure 10:
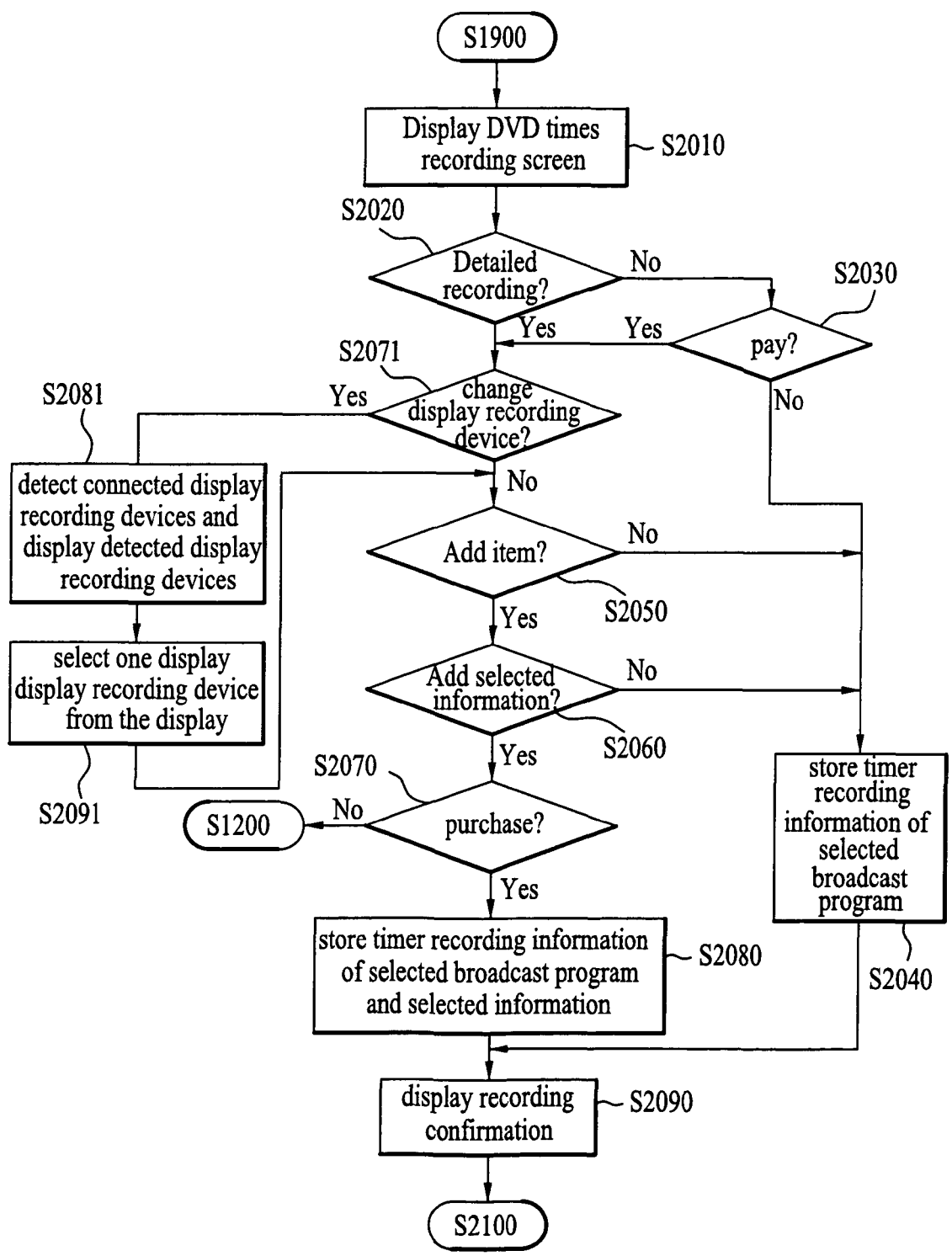
FIG. 10 is a flowchart illustrating a method of recording using a timer recording function in a DVD recorder in connection with the method of FIG. 8.

FIG. 10 is a flowchart illustrating a method of recording using a timer recording function in a DVD recorder in connection with the method of FIG. 8. In FIG. 10, the steps of timer recording is similar to that of FIG. 9 with an exception of a step providing a user an option to change the display recording device (S2071).

If the display recording device is kept and not changed by the user, the user is asked to add an item (S2050) as is the case in FIG. 9. If however, the user decides to change the display recording device, the other display recording device currently connected to the display device (e.g., computer) besides the selected display recording device is determined and displayed (S2081). Thereafter, the user can select one of the displayed display recording device (S2091), and after which, the user can be asked to add an item (S2050). The remaining steps are same as the steps of FIG. 9.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of recording using a timer recording function in a display device, the method comprising:
receiving an input data, wherein the input data is a user inputted instruction information for executing a timer recording function;
storing the instruction information which includes an instruction for a display recording device to begin and end recording a broadcast program of a certain designated channel at a specified time period in the future, and storing control data sorted according to a manufacturer of the display recording devices;
selecting the display recording device for recording the broadcast program;
reading control data for providing operational instructions to the selected display recording device corresponding to the manufacturer of the selected display recording device; and
transmitting the control data to the selected display recording device in an order set in advance by the manufacturer of the display device according to a preference of the display recording device manufacturer, wherein the order corresponds to the number of units of the selected display recording device in a region where the display device is used.

2. The method of claim 1, wherein the control data includes a first code which instructs the display recording device to turn on power, a second code which instructs the display recording device to begin recording, a third code which instructs the display recording device to stop recording, and a fourth code which instructs the display recording device to turn off power.

3. The method of claim 1, further comprising:
   determining if an Electronic Program Guide (EPG) is available;
   displaying the EPG for providing broadcast information if the EPG is available, wherein the broadcast information includes begin and end time of a broadcast program and a channel on which the broadcast program is broadcasted;
   selecting the broadcast information to execute timer recording function; and
   storing the selected broadcast information.

4. The method of claim 1, further comprising:
   determining if an Electronic Program Guide (EPG) is available;
   providing an On Screen Display (OSD) for allowing the user to enter the instruction information if the EPG is not available; and
   storing the entered instruction information.

5. The method of claim 1, wherein the display recording device is selected based on a first cable or a second cable.

6. The method of claim 5, wherein the second cable is a digital cable which enables two-way communication between the display device and the display recording device.

7. The method of claim 1, wherein the display recording device is selected based on a specific display recording device.

8. The method of claim 7, wherein the display recording device is a VCR, VTR, DVD recorder, DVD recorder with HDD, or DVHS.

9. A method of recording using a timer recording function in a display device, the method comprising:
   displaying an Electronic Program Guide (EPG);
   selecting from the EPG a broadcast program for timer recording or for timer viewing;
   selecting a display recording device for recording the broadcast program if the timer recording is selected;
   reading control data for providing operational instructions to the display recording device corresponding to a manufacturer of the selected display recording device;
   storing information of the broadcast program and the control data sorted according to the manufacturer of the display recording devices; and
   transmitting in sequence the control data to the display recording device in order of preference of the display recording device manufacturer, wherein the order corresponds to the number of units of the selected display recording device in a region where the display device is used.

10. The method of claim 9, wherein the control data includes a first code which instructs the display recording device to turn on power, a second code which instructs the display recording device to begin recording, a third code which instructs the display recording device to stop recording, and a fourth code which instructs the display recording device to turn off power.

11. The method of claim 10, wherein the first code and the second code are transmitted in sequence to the display recording device when a current time matches begin recording time entered by a user.

12. The method of claim 10, wherein third code and the fourth code are transmitted in sequence to the display recording device when a current time matches a ending time of the broadcast program.

13. The method of claim 10, wherein the third code and the fourth code are transmitted in sequence to the display recording device when a current time matches stop recording time entered by a user.

14. A method of recording using a timer recording function in a display device, the method comprising:
   displaying an Electronic Program Guide (EPG);
   selecting from the EPG a broadcast program for timer recording or for timer viewing;
   storing information on timer viewing if timer viewing is selected, wherein the timer viewing information includes a specified time in the future to begin viewing the selected broadcast program on a certain designated channel;
   returning to the EPG display after the timer viewing information is stored;
   selecting a display recording device for recording the broadcast program if the timer recording is selected;
   reading control codes for providing operational instructions to the display recording device corresponding to a manufacturer of the selected display recording device;
   storing information of the broadcast program and the control codes sorted according to manufacturer of the display recording devices; and
   transmitting in sequence the control codes to the display recording device in order of preference of the display recording device manufacturer, wherein the order corresponds to the number of units of the selected display recording device in a region where the display device is used.

15. The method of claim 14, further comprising:
   displaying a selection for a video option or an audio option;
   selecting any one of the video option, the audio option, or the video and audio options;
   storing, temporarily, the selected option until purchase of the selected option is made;
   storing the selected option if the selected option is purchased; and
   displaying confirmation of the option selection.

16. The method of claim 15, wherein the video option includes a multi-view feature, which includes camera shots from various angles, and a primary video or a secondary video.

17. The method of claim 16, wherein the secondary video is any one of a plurality of the broadcasting programs received in standard definition (SD) quality.

18. The method of claim 17, wherein the audio option includes a primary audio or a secondary audio.

19. The method of claim 18, wherein the primary audio is a language in which a broadcast is being broadcasted, and the secondary audio is the language in which an original broadcast was recorded or filmed.

20. The method of claim 15, further comprising:
   displaying a display recording device change option before selecting any one of the video option, the audio option, or the video and audio options;
   selecting from the display recording device change option to change the display recording device;
   displaying the plurality of display recording devices connected to the display device; and
   selecting any one of the connected display recording device.

* * * * *